United States Patent [19]
Pond et al.

[11] Patent Number: 5,275,462
[45] Date of Patent: Jan. 4, 1994

[54] VEHICLE SEAT WITH PIVOTABLE HEAD SUPPORTS

[75] Inventors: George Pond, Wisconsin Dells; Richard Reine, Reedsburg, both of Wis.

[73] Assignee: Seats Incorporated, Reedsburg, Wis.

[21] Appl. No.: 959,901

[22] Filed: Oct. 13, 1992

[51] Int. Cl.$^5$ .............................. A47C 7/36; A47C 7/62
[52] U.S. Cl. ...................... 297/191; 297/391; 297/404
[58] Field of Search ............... 297/191, 391, 404, 406

[56] References Cited

U.S. PATENT DOCUMENTS

| | | | |
|---|---|---|---|
| 3,204,775 | 9/1965 | Smith et al. | 211/75 |
| 3,466,091 | 9/1969 | De Grusso | 297/191 |
| 3,667,714 | 6/1972 | Ziaylek, Jr. | 248/284 |
| 3,823,907 | 7/1974 | Zaiylek, Jr. | 248/313 |
| 3,971,591 | 7/1976 | Ziaylek | 297/191 |
| 4,466,662 | 8/1984 | McDonald et al. | 297/391 |
| 5,213,392 | 5/1993 | Bostrom et al. | 297/191 |

FOREIGN PATENT DOCUMENTS 142822  5/1985  European Pat. Off. ............ 297/406

OTHER PUBLICATIONS

Brochure "911 Series" by Seats Incorporated–Bulletin No. 16-185 (Mar. 1991).
Zico Ziamatric Corp.–Brochure "Zico 87" –pp. 4–8, back of brochure.

*Primary Examiner*—Alexander Grosz
*Attorney, Agent, or Firm*—Michael, Best & Friedrich

[57] ABSTRACT

A vehicle seat for use in supporting a person wearing a self-contained breathing apparatus, the vehicle seat comprising: a frame; a seat cushion supported by the frame; a seat back assembly supported by the frame, the seat back assembly including a pair of spaced apart seat back members, the seat back members being spaced apart so as to house a self-contained breathing apparatus therebetween; a bracket mounted between and rearwardly of the spaced apart seat back members, the bracket being adapted to house a self-contained breathing apparatus; a headrest assembly supported by the frame above the seat back members, the headrest assembly including a pair of movable headrest members, the headrest members including a first headrest member hingedly connected to the frame for pivotal movement about a generally vertical axis between a first position wherein the first headrest member functions as a headrest and a forwardly pivoted position wherein the self-contained breathing apparatus housed between the seat back members can move forwardly without interference with the first headrest member, and a second headrest member hingedly connected to the frame for pivotal movement about a generally vertical axis between a first position wherein the second headrest member functions as a headrest and a forwardly pivoted position wherein the self-contained breathing apparatus housed between the seat back members can move forwardly without interference with the second headrest member.

7 Claims, 2 Drawing Sheets

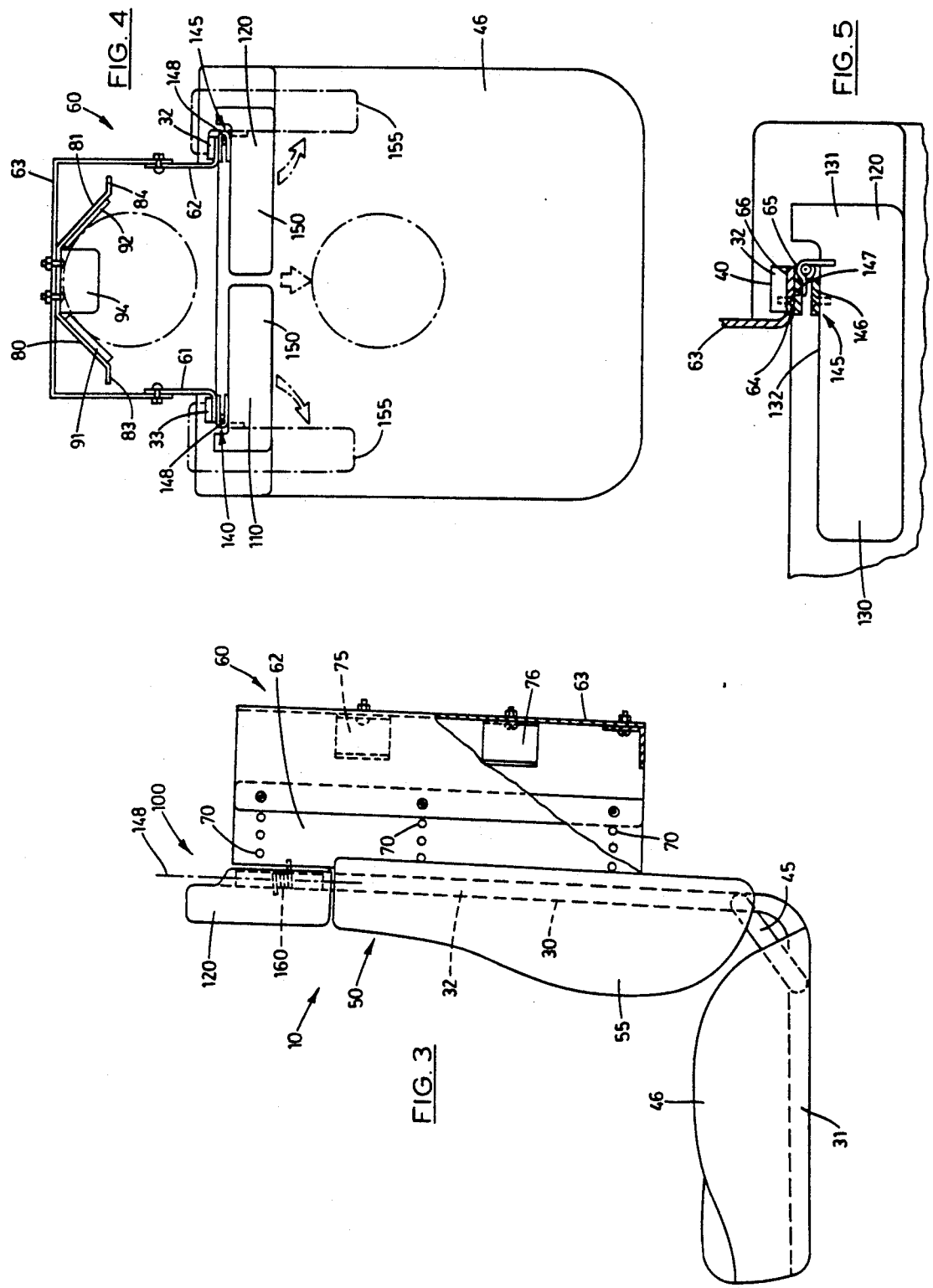

VEHICLE SEAT WITH PIVOTABLE HEAD SUPPORTS

BACKGROUND OF THE INVENTION

The invention relates generally to vehicle seats and, more particularly, to vehicle seats for use in supporting a person wearing a self-contained breathing apparatus.

Emergency vehicles, such as fire trucks, are commonly equipped with seats particularly adapted for use by persons wearing a self-contained breathing apparatus. Such seats are equipped with a bracket mounted adjacent the seat back and adapted to house and support the breathing apparatus such that a person sitting in the seat can strap on the breathing apparatus. Since time is often a critical factor, these persons must be able to quickly exit from the vehicle wearing the breathing apparatus. In particular, these persons want to quickly rise and step forward from the seat while wearing the breathing apparatus without obstruction and without having to first slide forward in the seat. It is also important that the vehicle seat be strong enough to support a person wearing the breathing apparatus, and that it have a headrest to provide support for its occupant.

Some prior art vehicle seats do not allow adequate clearance for the top of the breathing apparatus strapped to the person, and a person wearing the breathing apparatus cannot quickly rise and step forward from the seat. Some prior art seats avoid this problem by not providing a head support. Other prior art seats require the occupant to slide forward before rising in order to avoid interference between the breathing apparatus and the headrest. Other prior art brackets or back rests intended to support self-contained breathing apparatus tanks are shown in U.S. Pat. Nos. 3,204,775; 3,667,714; and 3,823,907.

SUMMARY OF THE INVENTION

The invention provides a vehicle seat for use in supporting a person wearing a self-contained breathing apparatus, the vehicle seat comprising: a frame; a seat cushion supported by the frame; a seat back assembly supported by the frame, the seat back assembly including a pair of spaced apart seat back members, the seat back members being spaced apart so as to house a self-contained breathing apparatus therebetween; a bracket mounted between and rearwardly of the spaced apart seat back members, the bracket being adapted to house a self-contained breathing apparatus; a headrest assembly supported by the frame above the seat back members, the headrest assembly including a pair of movable headrest members, the headrest members including a first headrest member hingedly connected to the frame for pivotal movement about a generally vertical axis between a first position wherein the first headrest member functions as a headrest and a forwardly pivoted position wherein the self-contained breathing apparatus housed between the seat back members can move forwardly without interference with the first headrest member, and a second headrest member hingedly connected to the frame for pivotal movement about a generally vertical axis between a first position wherein the second headrest member functions as a headrest and a forwardly pivoted position wherein the self-contained breathing apparatus housed between the seat back members can move forwardly without interference with the second headrest member.

Other features and advantages of the invention will become apparent to those of ordinary skill in the art upon review of the following detailed description, claims, and drawings.

BRIEF DESCRIPTION OF THE DRAWINGS

FIG. 3 is a side elevation view of the vehicle seat shown in FIG. 1.

FIG. 4 is a top plan view of the vehicle seat shown in FIG. 1.

FIG. 5 is an enlarged view of a portion of the vehicle seat shown in FIG. 4.

DETAILED DESCRIPTION OF THE PREFERRED EMBODIMENT

Figure 1:
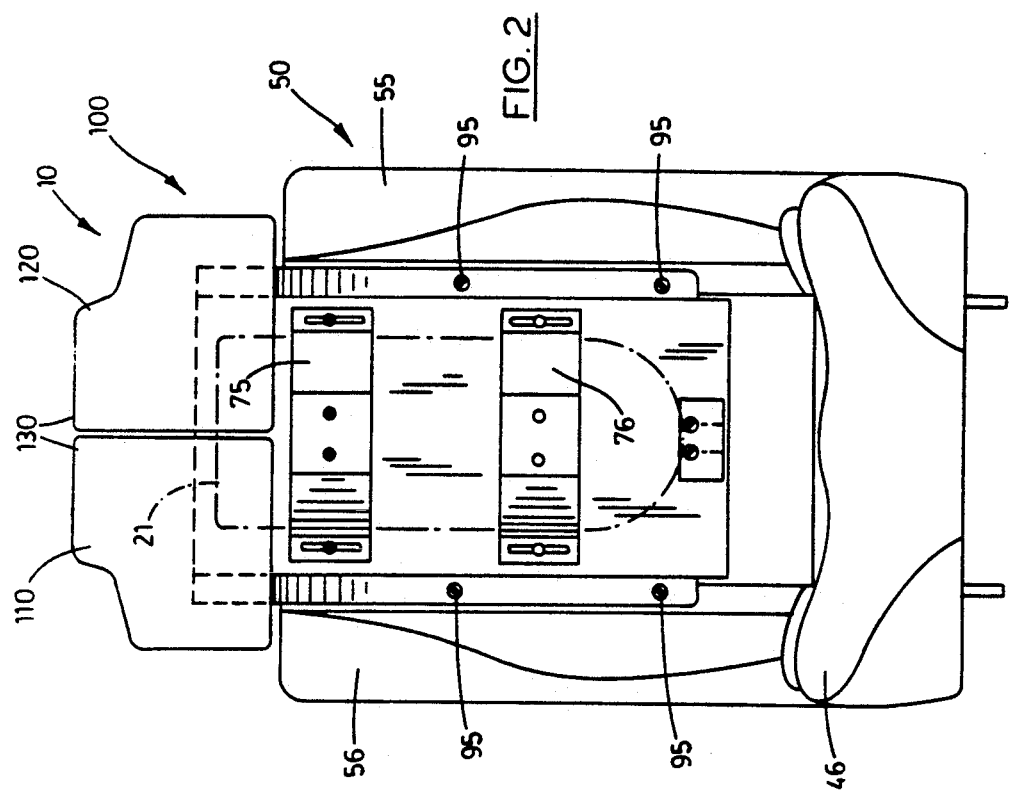
FIG. 1 is a perspective view of a vehicle seat embodying the invention.
Figure 2:
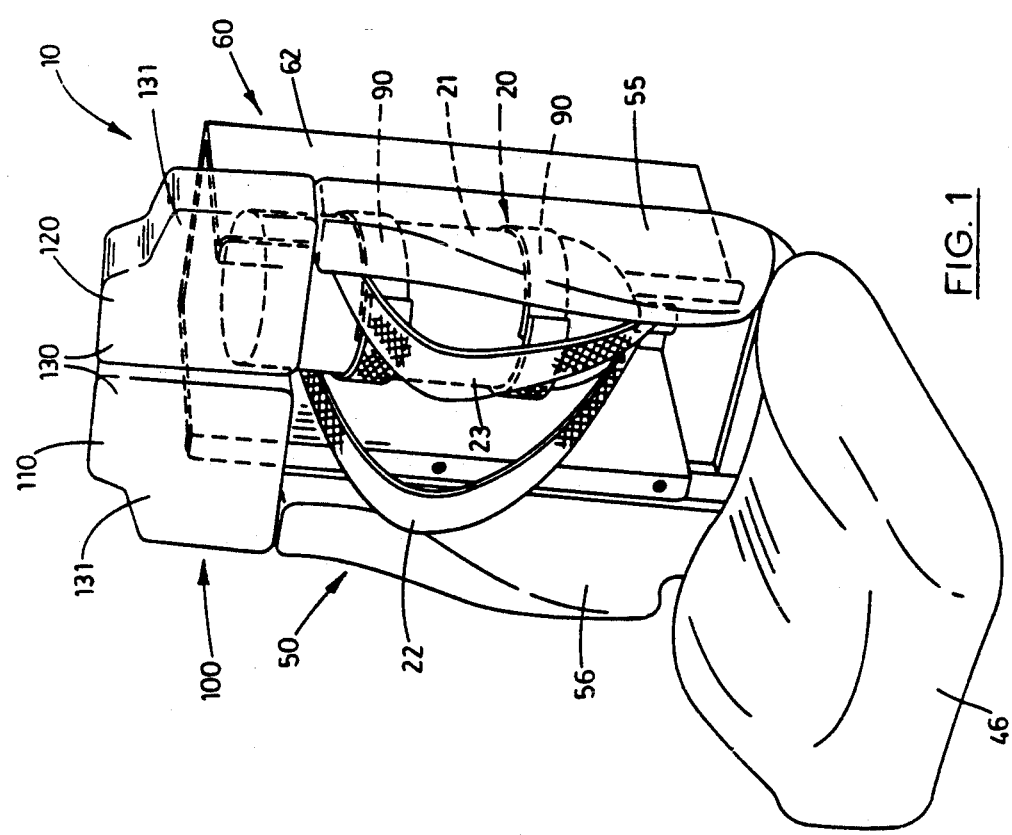
FIG. 2 is a front elevation view of the vehicle seat shown in FIG. 1.

Illustrated in FIG. 1 is a vehicle seat 10 for use in supporting a person wearing a self-contained breathing apparatus 20. The self-contained breathing apparatus 20 includes a tank 21 and a pair of shoulder straps 22, 23 connected to the tank 21. The vehicle seat 10 includes (FIG. 3) a frame 30 having a frame bottom 31. The frame 30 also has a pair of vertical frame members 32, 33 extending from the rearward portion of the frame bottom 31. The vertical frame members 32, 33 are spaced apart to allow the tank 21 to fit therebetween and are adapted to support the tank 21 in a manner discussed below. Each vertical frame member has (FIG. 5) an inner surface 40. The frame 30 also has (FIG. 3) a pair of gussets 45 (only one shown) rigidly joined to and extending between the lower portion of each vertical frame member 32, 33 and the respective rearward portion of the frame bottom 31. The vehicle seat 10 also includes a seat cushion 46 supported by the frame bottom 31, and a seat back assembly 50 supported by the vertical frame members 32, 33. As best shown in FIG. 2, the seat back assembly 50 includes a pair of seat back members 55, 56 which are spaced apart to house the tank 21 therebetween.

The vehicle seat 10 also includes (FIGS. 3 and 4) a bracket 60 which is mounted between and to the rear of the seat back members 55, 56. The bracket 60 includes a pair of sidewalls 61, 62 which extend rearwardly from the seat back members 55, 56. The bracket 60 also includes a rear wall 63 which extends between the pair of sidewalls 61, 62 so as to form an open box structure which houses the tank 21. Each bracket sidewall 61, 62 has a flange portion 64 with (FIG. 5) inner and outer surfaces 65, 66. Each sidewall 61, 62 also has (FIG. 3) three rows of horizontal holes 70 to allow for adjustment of the bracket 60. The rows of holes 70 are vertically spaced and are located near the upper, central and lower portions of the sidewalls 61, 62 respectively. As best shown in FIGS. 2 and 3, the bracket 60 also includes a pair of tank supports 75, 76 which are fixedly attached to the rear wall 63. The tank supports 75, 76 are vertically spaced apart to support the upper and lower portions of the tank 21. Each tank support 75, 76 has two side portions 80, 81 with (FIG. 4) inner surfaces 83, 84. Each tank support 75, 76 also has (FIG. 1) tank support straps 90 attached to and extending from each tank support side portion 80, 81 so as to wrap around and secure the tank 21 to the rear wall 63 of the bracket 60. Thus, the tank 21 can be stored in the seat 10 when not needed. If the tank 21 is to be used, the user releases the support straps 90 before sitting down, and places his or her arms through the straps 22, 23 while sitting down so as to be able to pull the tank 21 out from the seat 10 upon arrival at his or her destination. Each tank support 75, 76 further includes (FIG. 4) tank support pads 91, 92 which are fixedly attached to the inner surfaces 83, 84 of each tank support side portion 80, 81. The bracket 60 also includes (FIGS. 2-4) an angle bracket 94 having a generally vertically extending portion fixedly attached to the rear wall 63, and including a generally horizontally extending portion extending forwardly from the rear wall 63 so as to support the tank 21 against movement in the downward direction. The bracket 60 is fixedly attached to the frame 30 by (FIG. 2) a set of bolts 95 which secures the outer surface 66 of each flange portion 64 of the bracket sidewalls 61, 62 against the inner surface 40 of each respective vertical frame member 32, 33 (FIGS. 4 and 5).

The vehicle seat 10 also has a headrest assembly 100. The headrest assembly 100 is positioned above the seat back members 55, 56 and is supported by the upper portions of the vertical frame members 32, 33. The headrest assembly 100 includes a pair of movable headrest members 110, 120. Each headrest member 110, 120 has (FIGS. 1 and 5) a movable end 130, a pivotal end 131 and an inner surface 132. As best shown in FIGS. 3 and 5, the headrest members 110, 120 are connected to the upper portion of the respective vertical frame members 32, 33 by a pair of hinges 140, 145. Each hinge 140, 145 includes (FIG. 5) a movable hinge member 146 and a fixed hinge member 147. Each fixed hinge member 147 is fixedly connected to the inner surface 65 of the flange portions 64 of the respective bracket sidewalls 61, 62. Each movable hinge member 146 is fixedly connected to the inner surface 132 of the respective headrest members 110, 120 near the pivotal ends. The movable hinge members 146 are pivotally connected to the fixed hinge members 147 for relative movement therebetween about a generally vertical axis 148.

As best shown in FIG. 4, each headrest member 110, 120 is movable about a generally vertical axis 148 between two positions. The first position is a headrest position 150 where each headrest member 110, 120 functions as a headrest. When the headrest members 110, 120 are in the headrest position 150, the movable ends 130 of each headrest member 110, 120 are closely adjacent each other. Also, when the headrest members 110, 120 are in the headrest position 150, the headrest assembly 100 provides a generally continuous uninterrupted head supporting surface. The second position is a pivoted position 155 indicated by dashed lines. In the pivoted position 155, the headrest members 110, 120 are pivoted forward such that the tank 21 housed between the seat back members 55, 56 can be moved forward and removed from the box structure housing the tank 21 without being obstructed by the headrest members 110, 120. The headrest assembly 100 also includes (FIGS. 3 and 5) a pair of coil springs 160, 165 connected to the hinges 140, 145 to bias the respective headrest members 110, 120 toward the headrest position 150.

While a preferred embodiment of the invention has been disclosed by way of example, various modifications will become apparent to those of ordinary skill in the art. Therefore, the invention is to be limited only by the following claims.

We claim:

1. A vehicle seat for use in supporting a person wearing a self-contained breathing apparatus, the vehicle seat comprising:

a frame;

a seat cushion supported by the frame;

a seat back assembly supported by the frame, the seat back assembly including a pair of spaced apart seat back members, the seat back members being spaced apart so as to house a self-contained breathing apparatus therebetween;

a bracket mounted between and rearwardly of the spaced apart seat back members, the bracket being adapted to house a self-contained breathing apparatus;

a headrest assembly supported by the frame above the seat back members, the headrest assembly including a pair of movable headrest members, the headrest members including a first headrest member hingedly connected to the frame for pivotal movement about a generally vertical axis between a first position wherein the first headrest member functions as a headrest and a forwardly pivoted position wherein the self-contained breathing apparatus housed between the seat back members can move forwardly without interference with the first headrest member, and a second headrest member hingedly connected to the frame for pivotal movement about a generally vertical axis between a first position wherein the second headrest member functions as a headrest and a forwardly pivoted position wherein the self-contained breathing apparatus housed between the seat back members can move forwardly without interference with the second headrest member.

2. A vehicle seat as set forth in claim 1 wherein the frame includes a pair of vertically extending frame members adapted to support the self-contained breathing apparatus therebetween, and wherein the first headrest member includes opposite sides, one side positioned closely adjacent the second headrest member when the headrest members are in the headrest position, and a first hinge connecting the other side of the headrest member to one of the vertical frame members, and wherein the second headrest member includes opposite sides, one side positioned closely adjacent the first headrest member when the headrest members are in the headrest position, and a second hinge connecting the other side of the headrest member to the other vertical frame member.

3. A vehicle seat as set forth in claim 2 wherein the first hinge is positioned generally above one of the seat back members, and is supporting the first headrest member for pivotal movement about a generally vertical axis, and wherein the second hinge is positioned generally above the other seat back member, and is supporting the second headrest member for pivotal movement about a generally vertical axis.

4. A vehicle seat as set forth in claim 2 and further including means for biasing the headrest members toward the headrest position.

5. A vehicle seat as set forth in claim 2 wherein the headrest members swing forwardly and outwardly when the headrest members are pivotally moved from the headrest position.

6. A vehicle seat as set forth in claim 1 wherein the headrest assembly defines a generally continuous uninterrupted head supporting surface when the headrest members are in the headrest position.

7. A vehicle seat as set forth in claim 1 and further including means for preventing rearward movement of the headrest members when the headrest members are in the headrest position.

* * * * *